(12) United States Patent
Buschur (10) Patent No.: US 9,915,192 B2
(45) Date of Patent: Mar. 13, 2018

(54) POWER CONVERSION DEVICE

(71) Applicant: Jeffrey J. Buschur, Lake Orion, MI (US)

(72) Inventor: Jeffrey J. Buschur, Lake Orion, MI (US)

( * ) Notice: Subject to any disclaimer, the term of this patent is extended or adjusted under 35 U.S.C. 154(b) by 155 days.

(21) Appl. No.: 14/817,270

(22) Filed: Aug. 4, 2015

(65) Prior Publication Data

US 2016/0032817 A1 Feb. 4, 2016

Related U.S. Application Data (60) Provisional application No. 61/999,731, filed on Aug. 4, 2014.

(51) Int. Cl.
| | | |
|---|---|---|
| *F02B 33/44* | (2006.01) | |
| *F16H 13/06* | (2006.01) | |
| *F16H 13/14* | (2006.01) | |
| *F02B 33/40* | (2006.01) | |
| *F16H 47/06* | (2006.01) | |
| *F15B 11/16* | (2006.01) | |
| *F02B 39/04* | (2006.01) | |
| *F02B 39/08* | (2006.01) | |

(52) U.S. Cl.
CPC ............. *F02B 33/40* (2013.01); *F02B 39/04* (2013.01); *F02B 39/08* (2013.01); *F15B 11/16* (2013.01); *F16H 47/065* (2013.01)

(58) Field of Classification Search
CPC .......... F02B 33/40; F02B 39/04; F02B 39/08; F15B 11/16; F16H 47/065

USPC ...... 60/607–609; 123/559.1–559.3; 475/183, 475/195; 474/93

See application file for complete search history.

(56) References Cited

U.S. PATENT DOCUMENTS

| | | | | |
|---|---|---|---|---|
| 2,098,499 | A * | 11/1937 | Kishline ................. | F01M 1/12 123/559.1 |
| 3,307,426 | A * | 3/1967 | Whitaker ................ | F02C 7/277 475/2 |
| 3,489,035 | A * | 1/1970 | Giles ....................... | F16H 47/04 60/447 |
| 3,869,866 | A * | 3/1975 | Timoney ................. | F02B 37/10 60/608 |
| 4,622,817 | A * | 11/1986 | Kobayashi ............. | F02B 39/08 60/608 |
| 4,729,225 | A |  3/1988 | Bucher | |

(Continued)

FOREIGN PATENT DOCUMENTS

| | | | | |
|---|---|---|---|---|
| DE | 3104549 A1 * | 9/1982 | ............. | F15B 21/14 |
| WO | WO 2013118308 A1 * | 8/2013 | ............. | F02B 39/08 |

*Primary Examiner* — Thai Ba Trieu
(74) *Attorney, Agent, or Firm* — J. Gordon Lewis (57) ABSTRACT

A power conversion device in the form of a compressor drive constitutes a three channel power sharing transmission which allows power input and/or output from shafts on two of the channels along with hydraulic, electric or potentially pneumatic power input and/or output from the third channel. Varying the input and/or output of hydraulic, electric or pneumatic flow provides a continuously variable transmission function. Several embodiments of the power conversion device are described to drive a supercharger for an internal combustion engine providing a variable ratio coupling allowing effective use of a centrifugal type compressor across a broad range of operational engine speeds.

7 Claims, 9 Drawing Sheets

(56) References Cited

U.S. PATENT DOCUMENTS

| | | | | |
|---|---|---|---|---|
| 4,803,969 A * | 2/1989 | Hiereth | F02B 39/08 | 60/608 |
| 4,926,641 A * | 5/1990 | Keller | F02B 39/14 | 60/605.3 |
| 5,087,824 A * | 2/1992 | Nelson | F02B 63/00 | 290/1 A |
| 5,158,427 A * | 10/1992 | Shirai | F02B 39/08 | 277/428 |
| 5,346,364 A * | 9/1994 | Kapich | F02B 39/14 | 415/200 |
| 5,535,845 A * | 7/1996 | Buschur | B62D 5/07 | 180/417 |
| 5,561,978 A * | 10/1996 | Buschur | F01P 7/044 | 60/424 |
| 5,669,461 A * | 9/1997 | Buschur | F01P 7/044 | 60/424 |
| 5,687,568 A | 11/1997 | Buschur | | |
| 5,724,949 A * | 3/1998 | Liang | F02B 39/08 | 123/559.2 |
| 5,778,693 A * | 7/1998 | Mientus | F01P 7/044 | 123/41.12 |
| 5,881,630 A * | 3/1999 | Buschur | F01P 7/044 | 60/426 |
| 5,890,468 A * | 4/1999 | Ozawa | F02B 37/005 | 123/561 |
| 5,946,911 A * | 9/1999 | Buschur | B62D 5/07 | 60/424 |
| 5,960,628 A * | 10/1999 | MacHesney | F01P 7/044 | 60/424 |
| 5,960,748 A * | 10/1999 | Lewis | F01P 7/044 | 123/41.12 |
| 6,016,657 A * | 1/2000 | Buschur | F01P 7/044 | 60/424 |
| 6,021,641 A * | 2/2000 | Buschur | F01P 7/044 | 60/456 |
| 6,041,602 A * | 3/2000 | Dickey | F02M 26/07 | 60/605.2 |
| 6,158,216 A * | 12/2000 | Buschur | B62D 5/07 | 60/425 |
| 6,308,665 B1 * | 10/2001 | Lewis | F01P 7/044 | 123/41.12 |
| 6,412,278 B1 * | 7/2002 | Matthews | F02B 37/18 | 60/608 |
| 6,502,398 B2 * | 1/2003 | Kapich | F02B 39/08 | 60/608 |
| 6,612,822 B2 * | 9/2003 | Buschur | F04C 2/086 | 277/365 |
| 6,629,411 B2 * | 10/2003 | Buscher | F01P 7/044 | 137/115.14 |
| 7,111,704 B2 | 9/2006 | Johnson | | |
| 7,464,525 B2 * | 12/2008 | Dueckinghaus | F16H 61/4043 | 56/10.2 J |
| 7,481,056 B2 * | 1/2009 | Blaylock | F02D 23/00 | 60/602 |
| 7,490,594 B2 * | 2/2009 | Van Dyne | F02B 39/04 | 123/559.3 |
| 7,608,011 B2 * | 10/2009 | Grabowski | B60K 6/40 | 180/65.25 |
| 8,087,401 B2 * | 1/2012 | Inoue | F02B 39/04 | 123/559.3 |
| 8,366,412 B2 * | 2/2013 | Grethel | F02B 39/04 | 123/561 |
| 8,439,020 B1 * | 5/2013 | Carlson | F02B 39/04 | 123/559.3 |
| 8,490,393 B2 * | 7/2013 | Lofgren | F02B 39/04 | 123/559.3 |
| 8,668,614 B2 * | 3/2014 | Sherrill | F02B 39/04 | 475/183 |
| 9,080,503 B2 * | 7/2015 | Buschur | F02B 37/10 | |
| 9,212,602 B2 * | 12/2015 | Hisano | F02B 39/10 | |
| 2005/0217262 A1 * | 10/2005 | Takada | F16D 31/02 | 60/468 |
| 2006/0225419 A1 * | 10/2006 | Prusinski | F01D 25/18 | 60/605.1 |
| 2012/0266595 A1 * | 10/2012 | Buschur | F02B 39/08 | 60/607 |
| 2015/0114365 A1 * | 4/2015 | Naruoka | F02B 39/04 | 123/559.1 |
| 2015/0118025 A1 * | 4/2015 | Naruoka | F02B 39/04 | 415/123 |
| 2015/0118026 A1 * | 4/2015 | Naruoka | F02B 39/04 | 415/123 |
| 2015/0377258 A1 * | 12/2015 | Takahashi | F15B 11/17 | 60/421 |
| 2016/0024997 A1 * | 1/2016 | Buschur | F02B 37/10 | 60/607 |
| 2016/0076466 A1 * | 3/2016 | Moore | F02D 41/0007 | 60/273 |
| 2016/0252180 A1 * | 9/2016 | Sato | F16H 61/66259 | |

* cited by examiner

POWER CONVERSION DEVICE

RELATED PATENT APPLICATION

This application claims priority to U.S. patent application Ser. No. 61/999,731 filed 4 Aug. 2014, entitled "Power Conversion Device".

BACKGROUND

The planetary gear set has long been held as the primary means to provide the function of a power sharing transmission. The three channels of power input/output are well known to be the ring, planet carrier and sun. Power can be input/output on each of the three channels lending itself to the fundamental mechanism used for automatic transmission functions where locking one of each of the members to ground allows gear ratio changes as well as to blend/mingle the internal combustion engine and electric drive motor(s) for effective use in hybrid vehicle powertrains. In the case of the planetary set-up used in hybrid powertrains a varying drive ratio is produced by having one of the three planetary channels coupled to a motor/generator which in conjunction with the controller and batteries can change speed and direction in an infinitely variable manner. This speed and direction change provided by the motor generator typically on the highest mechanical advantage sun gear renders the planetary power sharing transmission as a CVT. The planetary however unto itself has no ability to vary the drive ratios to provide CVT function. To date no mechanism has emerged to allow varying drive ratios without dependency on frictional interfaces with exception of hydrostatic transmissions which are essentially a variable displacement pump coupled to the engine in hydraulic circuit with either a fixed displacement or variable displacement motor coupled to the drive wheels. Hydrostatic transmissions have the advantage of needing only hydraulic hoses to couple the engine to the drive wheels but all power transmitted is subject to losses incurred in rotary conversion to pressure and flow and conversely pressure and flow to torque and rpm at the drive wheels. There would be many potential uses for an efficient CVT one of which is to enable a centrifugal compressor to run at near constant speed as engine speed varies to provide boost for supercharging the engine.

FIELD OF THE INVENTION

Many internal combustion engines, particularly diesels, are equipped with a method of boosting the inlet air density in order achieve greater power per unit engine displacement. Traditionally there are two main approaches to provide air at a higher pressure than atmosphere or "Supercharged" to the intake of an engine. The first is to power an air pump with power drawn from the crankshaft which has become known in the vernacular as "Supercharging" and the second is to extract power via a turbine from the exhaust known as "Turbocharging". Both methods are means of "Supercharging" but the words Supercharging and Turbocharging have become commonplace to differentiate the mechanisms in which the compressors are powered. The vast majority of the diesel engine systems are turbocharged as power to weight ratios of naturally aspirated diesel engines make them non-competitive in the automotive market. Turbochargers are thus widely utilized in diesel and lately ever increasingly in spark ignition engines and enjoy a perception in the market that the power to drive the compressor is essentially free because it is derived from exhaust engine rather than being drawn from the crankshaft as in superchargers.

This is misleading in that the turbines used in the turbochargers need a significant increase in exhaust back pressure by which mechanical power can be extracted from the exhaust. Generally speaking with a typical 65% and 73% adiabatic efficiency in the turbine and compressor respectively, the required increase in exhaust backpressure is approximately equal to the level of intake boost achieved. This essentially causes the engine to consume more power on the exhaust stroke as the bottom of the piston is at or near atmosphere and the crank must therefore push the piston up during the exhaust stroke to move the exhaust out. For example if a 2.0 liter 4 cycle turbocharged engine is producing 220 ft-lbs of torque but has a 18 psi additional backpressure to drive the turbo it can be calculated as a Base Mean Effective Pressure (BMEP) of:

220 (ft-lbs)×24π/(2×61 ([(in)]˜3/liter)/2 (for 4 cycle))=272 psi 272 psi thus accordingly a 18/272=0.066 or 6.6% loss directly attributable to the turbo induced backpressure.

Further the over pressurized exhaust gas remaining above the piston when the exhaust valve closes expands and competes with intake air for volume in the combustion chamber during the intake stroke. This has a negative impact on engine air throughput and essentially renders the engine to a slightly reduced displacement equivalent. The equation below defines this effect.

$$e_v/e_{vb} = (k-1)/k + (r - p_e/p_i)/(k(r-1))$$

Equation (3) from SAE Paper 730195 Bolt, Bergin and Vesper, Dept. Mechanical Eng., University of Michigan Where:

$e_{vb}$ is engine volumetric efficiency when inlet pi and exhaust pressures $p_e$ are equal r is the engine compression ratio $e_v$ is the effective efficiency when the ratio is not unity.

This effect will reduce engine air mass throughput by some 5% when operating at a typically pressure ratio of 2.0 (or 14.7 psi boost). It is interesting to note that the lower compression ratios used by supercharged and turbocharged engines in range of 9 to 10 compared to 11 to 13 for equivalent naturally aspirated engines exacerbate this effect.

Overall, despite these little known power losses, turbo charging is still a more efficient means of driving a compressor than with power drawn directly from the crank if the turbocharger can be sized to be optimal at higher ranges of engine speed. If the turbocharger is optimized for lower end engine speed range these losses are greatly increased.

Well known in the industry is the turbochargers delay in achieving the rotational speed required to develop a meaningful air pressure rise over atmosphere "or boost" which has become known as "turbo lag". The delay is caused by the iterative process of time needed for the increase in engine air flow and thus exhaust throughput to increase and the inertial resistance of the turbine and compressor shaft assembly to rotational acceleration.

Traditionally turbochargers also have had some limitations as to the boost levels available at lower engine speeds due to limited exhaust gas velocity and passageway and turbine sizing necessary to allow maximized power at high engine speeds. Recently with the renewed emphasis on energy conservation there is much focus on using turbochargers to allow lower displacement engines (engine downsizing) in passenger vehicles thus increasing fuel efficiency. These downsized engine passenger vehicle applications have driven significant changes in turbo technology to allow the instantaneous acceleration desirable rather than the sustained high speed power to which turbochargers are naturally suited. Turbocharger technology had been enhanced to overcome these obstacles in a number of ways. One such trend is use of smaller exhaust passages and low inertia turbos to allow faster spool up times to greatly reduce lag but at the cost of torque reducing restriction of air and exhaust at higher engine speeds. Another trend in the industry is multiple (aka sequential) turbos utilizing the ability to employ a restrictive quick spooling turbo for rapid acceleration and switching to a larger "free breathing turbo" as time and engine speed allow.

These downsizing efforts are primarily directed to gasoline engines where these limitations become more pronounced due to generally larger operating speed ranges than in diesel engines.

Whether the forced air induction system is powered by an exhaust turbine or by power directly taken off the crank a mechanism or compressor must be employed to move air from atmospheric pressure up into the pressurized or supercharged engine intake manifold. Compressors can be categorized as being of positive or non-positive displacement. Positive displacement devices move a distinct or calculable volume of air from intake to outlet per stroke or angular input angle. Further within the positive displacement category are internal and external compression devices. An internal compression device takes a defined volume of air from inlet closes off that volume within a chamber and then reduces the volume of the chamber before discharging the air at the outlet. An example of this type of compressor is the Lysholm screw. One disadvantage of internal compression devices is that even when in bypass mode a considerable amount of work is exerted on the throughput air raising parasitic losses. An external compression compressor takes a volume of air from inlet, closes it off and simply moves it to the outlet port where the volume is then opened to the pressurized region beyond. As this volume of air remains at inlet pressure there is an instantaneous backflow into the chamber as the outlet opens. The volume quickly rises to outlet pressure and then that volume is pushed into the pressurized region so the compression takes place "outside" the compressor. This flow reversal and rapid re-pressurization takes place as every chamber opens to outlet or several times per revolution tending to create a pulsing noise. An example of an external type compressor is the Roots compressor which is highly prevalent in belt driven supercharging systems. All positive displacement devices loose efficiency rapidly at higher pressure ratios (>2.0 or boost >15 psi) as fixed clearances at mechanical interfaces dissipate more and more of the throughput. Also as this leakage is primarily a function of pressure, efficiencies of fixed displacement devices can be quite poor at higher pressures in lower speed ranges where this leakage is a larger percentage of through-put.

Non-positive displacement compressors employ either centrifugal forces or aerodynamics involving airfoils and turning vanes (aka axial devices) as in jet engine compressor sections to raise air pressure. The volume of air moving through them cannot be determined strictly from rate of angular displacement but rather a number of conditions must be known to predict their behavior.

Centrifugal type compressors are employed exclusively as coupled with turbines in a turbocharger. Their simplicity of construction and high efficiencies make them desire-able as air pumps for these applications. Given that within the moving interface of the device air velocities are high and pressures are actually low, leakage is not an issue. In fact most centrifugal compressors operate more efficiently at pressures higher than positive displacement devices can reasonably function.

Centrifugal compressors are also employed on some low volume OEM applications and aftermarket applications in a belt driven configuration. They create a very potent configuration in upper engine speed ranges but the inertia of the high speed impellers as reflected through their step up gearboxes to the drive pulley create exceedingly high loads on the belt upon rapid engine speed changes. They are also at the disadvantage that the pressure or boost created by the spinning impeller is a function of speed squared. Thus it is a compromise as to the pulley ratio at which meaningful boost is created in the lower engine speed ranges with-out consuming huge amounts of power at high engine speeds.

From the aforementioned it can be deduced that centrifugal compressors are desirable and that although an efficient means of powering a forced air induction device turbo charger power is not without power losses. Lag as mentioned is also a considerable challenge for an optimized system. Thus it can be understood that a drive mechanism which can efficiently change the speed of a centrifugal compressor independent of engine speed would be highly advantageous.

PRIOR ART

Several devices have been defined to provide a workable means for a variable drive for a centrifugal compressor for an automotive forced air induction system.

U.S. Pat. No. 8,439,020 to Carlson and Jones defines a variable ratio drive supercharger assembly which includes a dry-running CVT coupled to a speed multiplying gear set. This is in turn is coupled to a centrifugal supercharger. An electric actuator allows changing of the pulley ratios to allow the centrifugal compressor to reach operational speeds at lower engine speeds and reduce ratio to maintain boost pressure capability without excessive power draw as engine speed increases. Packaging and costs of the device appear to be prohibitive.

U.S. Pat. No. 8,366,412 to Grethel defines a means in which two inputs are combined through use of a planetary and power sharing transmission as a summer to drive a centrifugal compressor. One input is coupled directly to the engine via belt and pulley and the other drive input is from a variable speed hydraulic motor and pump. By changing the speed of the hydraulic motor in both forward and reversing directions the output of the planetary and thus speed of the compressor can be varied. One potential drawback of the mechanism is the requirement for the planetary gear set to be rapidly running backward when in the quiescent state potentially raising parasitic losses and noise levels.

U.S. Pat. No. 9,080,503 B2 to J. Buschur et al. entitled "Hydraulic Turbo Actuator Apparatus" describes the use of the hydraulically driven device in a series configuration with a minimally restrictive turbocharger is defined which will allow a very responsive and powerful boosting system to reach boost levels of 4-5 pressure ratio (PR) to support and enable OEM engine downsizing trends. An electric supercharger is also considered. A hydraulic drive assists to increase the acceleration rate of a turbocharger impeller/turbine shaft assembly and provide a secondary means of driving the compressor impeller at lower engine speeds where exhaust gases alone does not generate adequate shaft speeds to create significant induction boost. The hydraulic circuit includes a dual displacement motor, which provides high torque for acceleration yet converts to a single motor for high-speed operation. When the exhaust driven turbine function allows compressor speeds, beyond which the hydraulic system can contribute, a slip clutch allows disengagement of the hydraulic drive. In an alternative embodiment, the hydraulic drive provides means of forced induction air alone.

U.S. Pat. Nos. 8,439,020, 8,366,412 and 9,080,503 B2 are hereby incorporated herein by reference in their entirety.

SUMMARY OF THE INVENTION

It is an object of this invention to provide a practical new means by which power sharing transmission can be constructed without use of a planetary gear set and additionally a means by which this power sharing can also offer a CVT function which is free from dependence on friction yet maintains practical levels of efficiency.

It is an object of this invention to provide means to drive an automotive centrifugal air compressor to supercharge an engine through a unique rotational summer device such that some of the power delivered to the compressor is channeled directly from the engine through the accessory belt or equivalent gear drive and further some of the power delivered to this same compressor is borne via means of a hydraulic drive.

It is a further object of this invention to illustrate means to provide infinite speed control by adding and subtracting these two channels of power to the compressor such that engine intake air pressure can be controllably adjusted independent of and across all engine speeds.

It is yet further another object of this invention to provide definition of certain features making the prior two objectives feasible, efficient and cost effective.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which.

Although the drawings represent several embodiments of the present invention, the drawings are not necessarily to scale and certain features may be exaggerated in order to illustrate and explain the present invention. The exemplification set forth herein illustrates embodiments of the invention, in several forms, and such exemplifications are not to be construed as limiting the scope of the invention in any manner.

DESCRIPTION OF THE PREFERRED AND ALTERNATIVE EMBODIMENTS OF THE INVENTION

Figure 1:
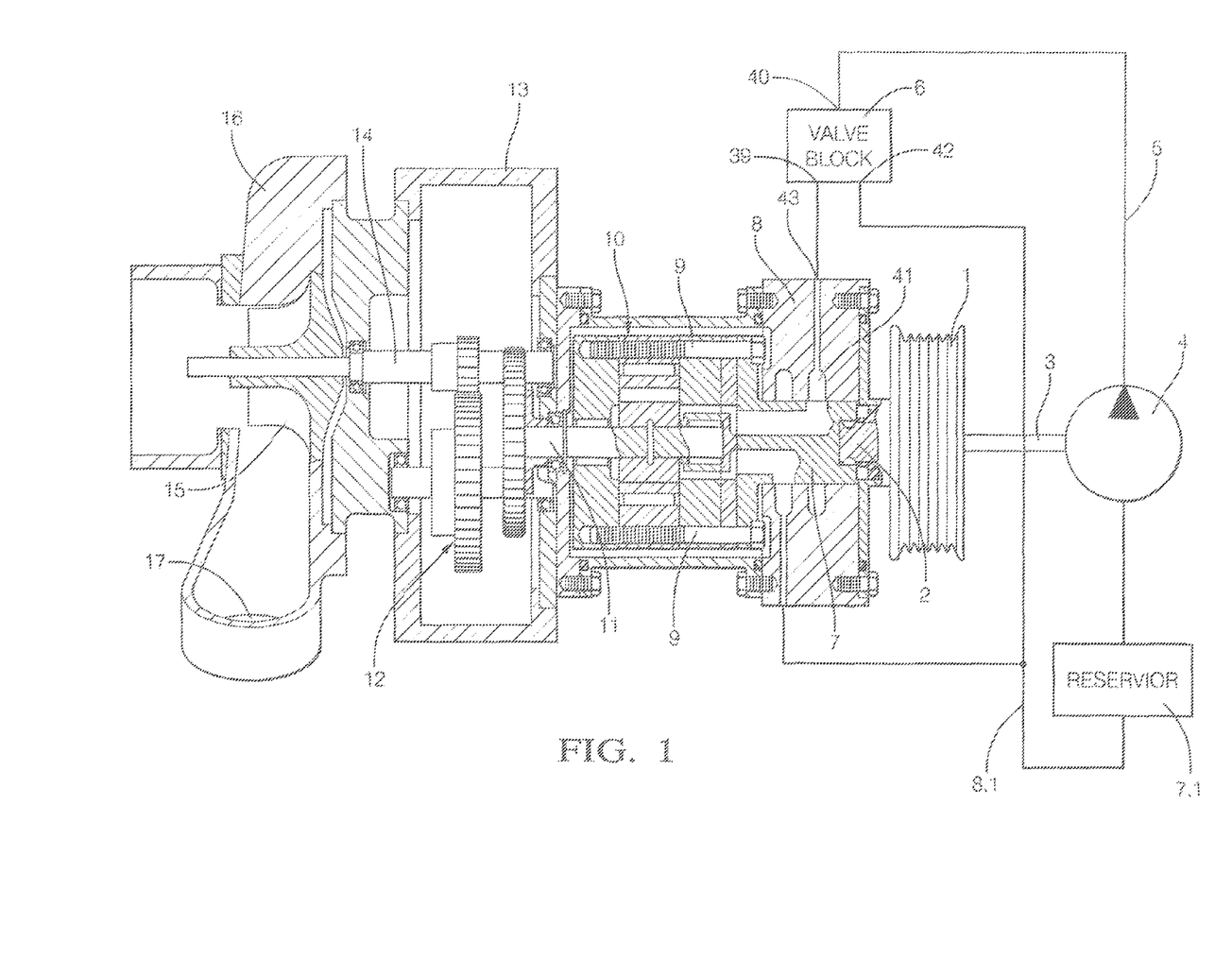
FIG. 1, is an overall view of a power conversion device embodying the present invention in the form of a compressor drive.

Referring to FIG. 1, an overall system view shows a Drive Pulley 1 with shafts 2 and 3 projecting in either direction. Coming from the pulley 1 to the right is shaft 3 driving a pump 4 which feeds flow through a conduit 5 to and from a valve block 6 with a reservoir 7.1 on a return line 8 and from the other side of the pulley 1 extends drive shaft 2 affixed to a valve cylinder 7 rotating within a cylinder block 8. The pulley 1 is driven by an accessory belt (not shown) and turns at a speed roughly 2× that of the associated engine. Rigidly attached to the valve cylinder 7 are a group of parts clamped together by bolts 9. These parts which are bolted to the valve cylinder 7 comprise a rotating motor stack 10 in which is nested a hydraulic motor. An output shaft 11 of the hydraulic motor turns independently either faster or slower than the rotating motor stack 10. The output shaft 11 in turn drives a step up gearing mechanism 12 housed in a gear box 13 which may be typically of 1:12 speed increasing ratio. The output of the gear box 13 turns a centrifugal compressor shaft 14 which in turn drives an impeller 15 situated in a compressor housing 16 at a high rate of speed providing pressurized intake air for an engine at a compressor outlet 17.

Figure 2:
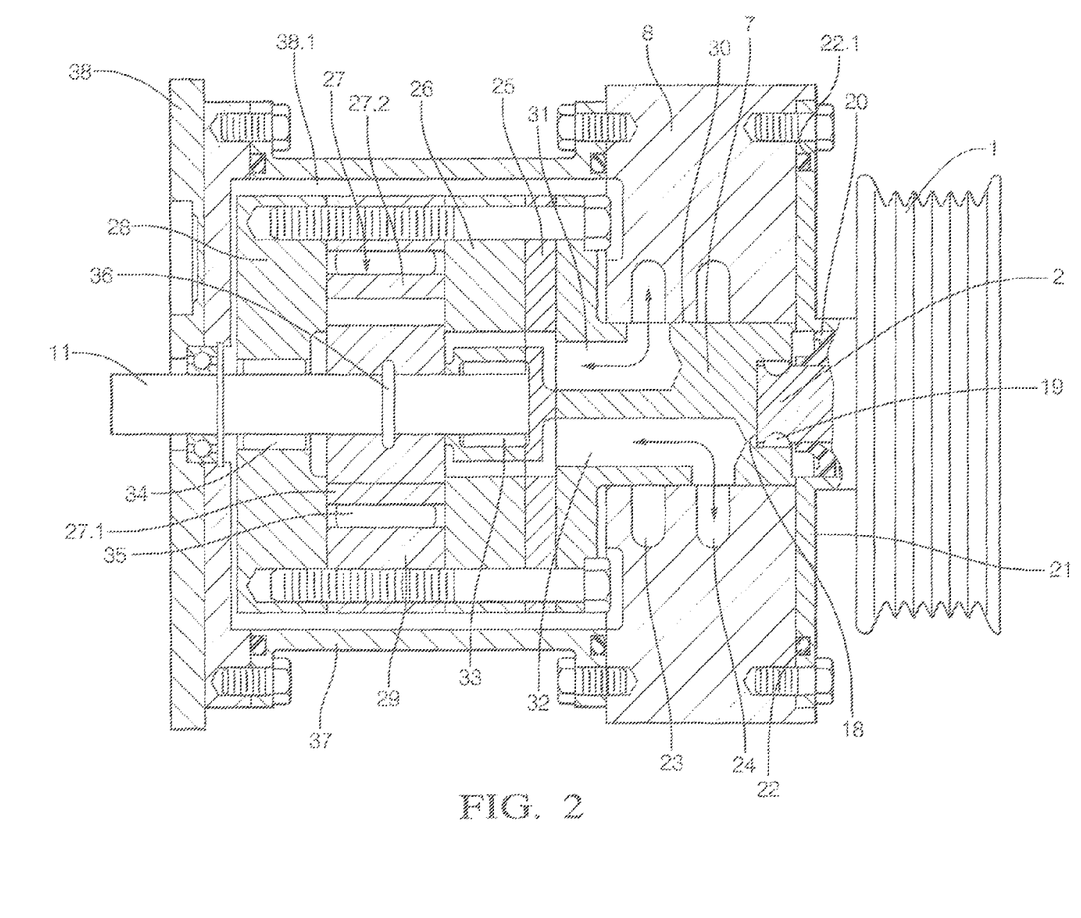
FIG. 2, is a detailed cross section of a portion of the motor of FIG. 1.

Referring to FIG. 2, the device will be discussed in greater detail and the method and significance of function will be described. The drive pulley 1 again shown on the right is rigidly attached to drive shaft 2 which is in turn coupled to the rotating valve cylinder 7 via an interface 18 which accommodates some level of misalignment such as the Woodruff keys 19 shown. Between the pulley 1 and valve cylinder 7 is placed a shaft seal 20 housed in the seal plate 21 which is attached and sealed by a seal 22 in a groove 22.1 against the cylinder block 8. The valve cylinder 7 has passages 31 and 32 which comprise the supply and return channels for oil flow in and out of the hydraulic motor comprised of port plate 25, inner end frame 26, gerotor assembly 27, motor ring 29 and outer end frame 28. Radial grooves 23 and 24 are fly cut on the bore 30 in the cylinder block 8 in which the valve cylinder 7 turns communicate with the supply and return channels 31 and 32 in the valve cylinder 7. In this manner the amount and direction of oil flow to the motor assembly can be controlled from valves housed within the valve block 6. The inner end frame 26 and outer end frame 28 house roller bearings 33 and 34 which support the motor shaft 11. The motor ring 29 contains a larger roller bearing 35 which supports the outer ring 27.1 of the gerotor 27 (epi-cycloidal gears) which are the motive force of the motor. A drive pin 36 engages the inner gerotor ring of 27 to the motor shaft 11. A motor housing 37 rigidly positions and seals the cylinder block 8 to the bearing block 38 creating a sealed enclosure 38.1 for the rotating valve cylinder 7 and motor stack assembly 10. The bearing block 38 further is attached and partially comprises gear box 13. Passageways through the port plate 25 and inner end frame 26 allow communication for the oil from the valve cylinder 7 to the motor ports not shown but formed within inner end frame 26.

This mechanism and arrangement embody a device in which power can be delivered to the motor shaft 11 and thus through gearbox 13 to the compressor impeller 15 via two means thus creating a power sharing transmission. The first would be power turning the motor stack 10 at some torque and speed directly through the valve cylinder 7, drive shaft 2 and pulley 1 from the engine. The second would be power defined by that same magnitude of load torque turning either in an additive or detracting direction via the hydraulic flow in and out of the motor gerotor 27 turning it relative to the rotating motor stack 10. It should be understood by the reader that torque multiplied by angular speed defines power, thus if the motor gerotor 27 is stationary within the rotating motor stack 10 the power to the gearbox 13 and compressor impeller 15 are provided solely by the direct drive from the pulley 1.

Referring now back to FIG. 1, if hydraulic flow from pump 4 is fed to valve 6 through port 40 and the valve directs flow out of port 39 through conduit 43 to passage 41 this will drive the flow through valve cylinder 7 and into motor gerotor 27 in a direction that is additive to the motion provided directly to the motor stack 10 via transmission of torque from the pulley 1, the two motions would be additive but the hydraulic drive would only be required to render that level of power which is required to define the speed relative to the rotating motor stack 10. It should be noted that if the construction is such that passage of oil into the motor through conduits 43 and 41 to fly cut passage 24 (shown on FIG. 2) drive the motor in additive motion to the direct drive, these passageways will always be the high pressure side of the motor. The reason is that the torque load on impeller 15 through gear train 12 will always create a higher pressure on valve cylinder passage 32 and fly cut 24 whichever way the gerotor 27 in motor stack 10 is turning. Therefore conversely if the valve 6 allows flow to leave the motor opposite the angular motion of the direct drive from the pulley 1, the gerotor 27 of the motor in the rotating stack 10 will turn backwards becoming a pump and resistance to that flow in valve 6 from port 39 to port 42 and thus through conduit 8 to the reservoir 7.1 will define the degree that the motor rotation allows the input shaft 11 to the gear train 12 to slip relative to the motor stack 10 detracting from the motion of drive pulley speed 1. In this manner the gerotor 27 within the rotating motor housing stack 10 is driving rotating shaft 11 turning relative to the motor stack 10 which accordingly comprises a mechanical summer as is commonly accomplished via planetary gear sets today. The three channels of input/output making the device similar in overall function to a planetary gear-set are the direct drive shaft 2 coupled to valve cylinder 7, the motor output shaft 11 and the hydraulic flow moving in or out of motor stack 10 allowing relative rotary motion between.

Figure 3:
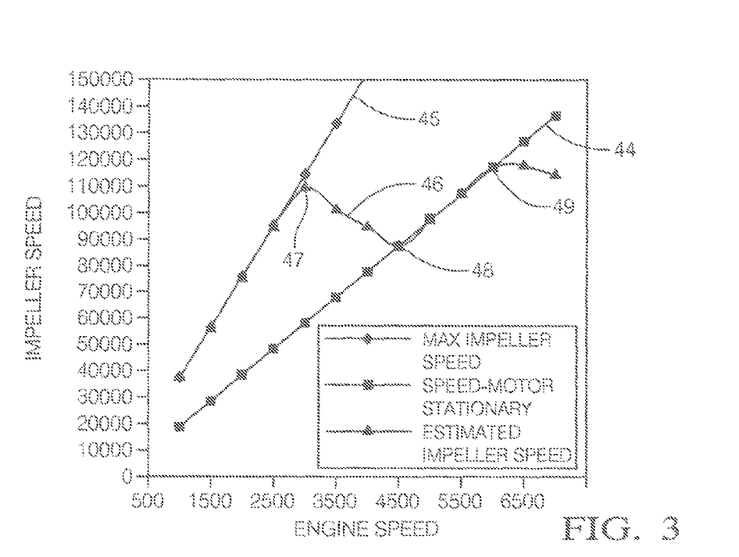
FIG. 3, is graphical analysis output indicating speed capability of the drive versus engine speed.

FIG. 3 shows an illustration of the basic function of the device. The "Speed Motor Stationary" line 44 represents the impeller speed of the compressor impeller 15 as a function of engine speed when the hydraulic motor gerotor 27 mounted in the rotating motor assembly 10 is stationary. In this illustration the pulley ratio is at 1:1.6 and speed increaser mechanism has a 1:12.25 ratio. (Note both of these ratios are step-up) The speed of impeller 15 would thus range from approximately 20000 rpm at 1000 engine rpm to near 130,000 rpm at engine speed of 6500. This would be problematic as the boost developed by a centrifugal compressor rises as the square of the speed. This is the basic nature of the belt driven centrifugal superchargers on the market today and one of the reasons why they are marginally viable. A single drive ratio must be chosen that will attempt to provide adequate boost at lower engine speed while not consuming too much power at the higher ranges of engine speed. It should be noted the efficiency of this drive however would be near 100% as only the belt losses and gearing/bearing loses would be detracting from the power delivered to the compressor. The "Max Impeller Speed" line 45 depicts the maximum speed attainable if an 11.3 cc/rev pump 4 driven at the speed of the driven pulley 1 is forcing oil into a 9.8 cc/rev motor both operating at 87% volumetric efficiency and adding to the speed of the drive provided directly from the pulley. As can be seen this line of operation starts at some 40000 rpm at 1000 engine rpm and exceeds 150,000 rpm in the range of 3750 engine rpm. The "Estimated Impeller Speed" line 46 represents a function of maximum impeller speed which may be obtained by adding and subtracting speed generated by hydraulic motor motion to the speed induced by the input directly from the pulley drive via control by hydraulic valves.

From 1000 engine rpm to 2750 engine rpm at point 47 the hydraulic motor rotation would add to the rotation induced by the pulley direct drive with all of the hydraulic flow being produced by the pump 4 being consumed by the motor gerotor 27 within rotating motor stack 10. From 2750 rpm to 4500 rpm, valving would be bypassing flow around the motor otherwise impeller speeds, power draw and oil pressure would rise unacceptably. At 4500 engine rpm at point shown 48 the direct drive from the pulley would provide acceptable input speed to the gearbox and the hydraulics would essentially be deactivated. This range from 4500 to 6000 engine rpm is the power band during which the compressor would essentially be direct pulley gear drive allowing a high level of power transmission efficiency. Above 6000 rpm at point 49 the valving would allow backward flow in and out of the motor allowing it to spin in the opposite direction detracting from the direct pulley drive speed.

Figure 4:
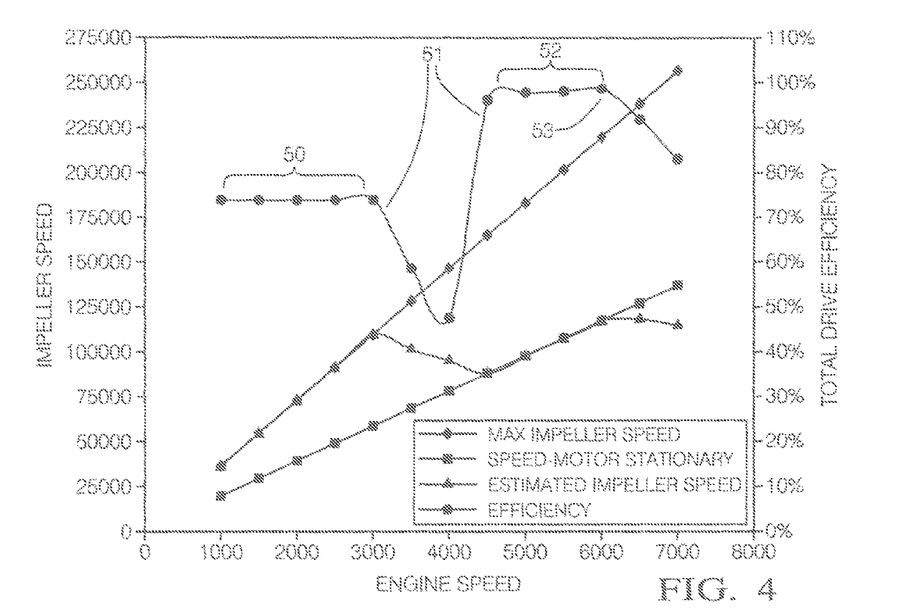
FIG. 4, is a graphical illustration of drive efficiency.

FIG. 4 indicates the impact on power transmission efficiencies from the engine crank to the compressor. As previously stated the motor and pumps in these illustrations have a volumetric efficiency of 87%. The mechanical efficiencies for the pump and motor are estimated at 89% and 85% respectively. Overall efficiency of a hydraulic device is obtained by multiplying volumetric by mechanical efficiency. The pump is therefore 87%×89%=77% and the motor 87%×85%=74%. All these numbers are over simplifications as both mechanical and volumetric efficiencies vary with speed, pressure and temperature but for simplicity sake they are considered constants for these illustrations. Aside from any loses from bypass flows the hydraulic drive efficiency would then be 77%×74%=57%.

Now viewing the efficiency line which is scaled on the right hand axis, it can be seen that the efficiency from 1000 engine rpm to 3000 rpm is approximately 74% as shown by line segment 50. Despite the fact that the hydraulic motor is spinning the gearbox input shaft faster than the direct drive from the pulley the efficiency is higher than the 57% efficiency of the hydraulic drive because only a portion of the power is transmitted through the hydraulics. The remainder moves through the direct drive which is on order of 99% efficient. In the transition period between 3000 engine rpm and 4500 engine rpm shown at line segment 51 the efficiency dips to slightly below 50% for a brief range because in addition to the hydraulic power transmission efficiency of 57% there are additional losses in the flow bypassed by the valves.

In the main power band of the engine from 4500 to 6000 rpm as shown at line segment 52 the power transmission efficiency is very high on order of 98% because the power is borne by the direct drive only. A small amount of losses are accounted for in the pump as it churns unused flow.

Later at above 6000 engine rpm point 53 the efficiency trends downward to a low approaching 80% as the hydraulic motor slipping backward and pumping flow across a control valve configuration yet to be described represent a loss.

Figure 5:
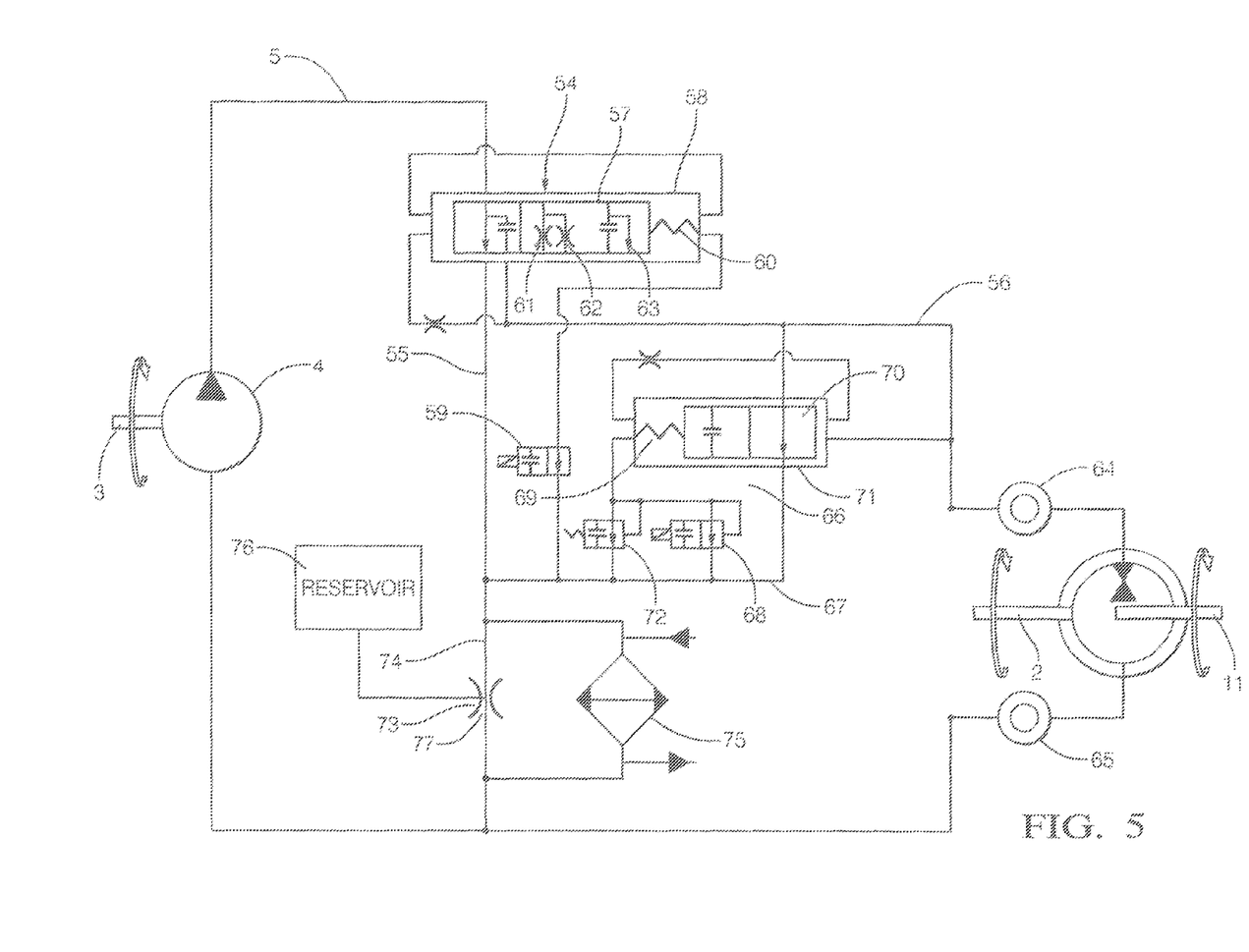
FIG. 5, is a hydraulic schematic of the power conversion device.

Referring to FIG. 5, a hydraulic schematic capable of controlling flow in and out of the motor to facilitate function is described in FIGS. 3 and 4. Flow from a pump 4 directly coupled to the engine via pulley and belts or gears provides flow through conduit 5 to a two position 3 port valve or pump control valve 54. This valve receives flow from the pump 4 and directs it either into the motor via conduit 56 or to a bypass 55 back towards the inlet of the pump. In the relaxed mode the control spool 57 operating in bore 58 of the valve 54 is in bypass but as the pump solenoid valve 59 is restricted flow is no longer drained from the spring chamber 60 to the right of the spool 57 and it begins to move to the left. Initially a transition position is reached in which flow is divided between bypass 61 and outlet 62 feeding the motor allowing the amount of flow to each to be varied. As the valve spool 57 continues to move to the left eventually all flow is directed to the motor through valve out 63. Flow from the pump drives the motor output faster than the direct engine driven rotation as described related to engine speeds below 4500 rpm as per FIGS. 3 & 4.

For clarity the rotary fluid couplings 64 and 65 are shown which allow flow to be channeled in and out of the main rotating assembly directly driven by the engine.

A second valve defined as the motor slip valve 66 provides a controllable means by which the motor comprised of gerotor 27 contained in rotating motor stack assembly 10 can be allowed to be driven backwards by the reactionary torque of the compressor gearbox becoming a pump when the compressor is moving slower than by the direct engine driven rotation. This two position two port valve controls restriction on a bypass 67 which allows this flow to move in the opposite direction through the motor and the rotary fluid couplings 64 and 65. The motor solenoid valve 68 determines the amount of flow which is allowed to escape from the spring chamber 69 shown to the left of the motor slip valve spool 70 moving within bore 71. As the spring chamber pressure at 69 is lowered by this drainage through motor solenoid valve 68 the valve spool 70 will move to the left allowing a controllable restriction by which the slip rate of the motor/pump can be controlled.

There is further shown a relief valve 72 which when triggered can also drain the spring chamber 69 on the motor slip valve 66 allowing motor slippage. This mechanism limits the maximum system hydraulic pressure on the motor/pump and thus the maximum torque that can be applied to the speed increasing gearbox. Ultimately this allows a means by which belt and drive loads can be limited particularly by inertial loads which is a problem on aftermarket belt driven centrifugal compressors.

In hydraulic motoring operation as shown in FIG. 3, line 45 of the motor slip valve 66 would be closed while the pump control valve 54 is forcing flow into the motor. Conversely, the pump control valve 54 would be in bypass or relaxed mode when either the motor slip valve 66 is closed causing a direct locked drive from engine to compressor or when the motor slip valve 66 is open allowing the compressor to freely slip back. In this mode there may also be advantage to decoupling pump 4 from the engine drive reducing parasitic losses.

Further there would be provided a restriction 73 in the return line 74 which is common to the pump and the motor which would provide a pressure drop for controlling the flow rate through a liquid to liquid cooler. As flows and power levels in the device increase the delta pressure across the restriction would rise and more flow would be directed to the glycol coolant circuit 75. Thus at lower flow rates and accordingly lower engine speeds flow to the glycol coolant circuit 75 would be reduced allowing oil to stay warmer reducing viscous losses. The restriction 73 would also provide an atmospheric pressure clamp (reference point) to keep the system from changing pressures due to volumetric expansion/contraction of the fluid due to pressure and temperature changes. Small amounts of oil would come in and out of the system as make-up from the reservoir 76. As the flow slowed through the diverging passage 77 leaving the restriction velocity would be traded for pressure via Bernoulli Effect, providing an oil inlet boost mechanism to prevent cavitation in the pump and/or the motor/pump when in pump mode.

Figure 6:
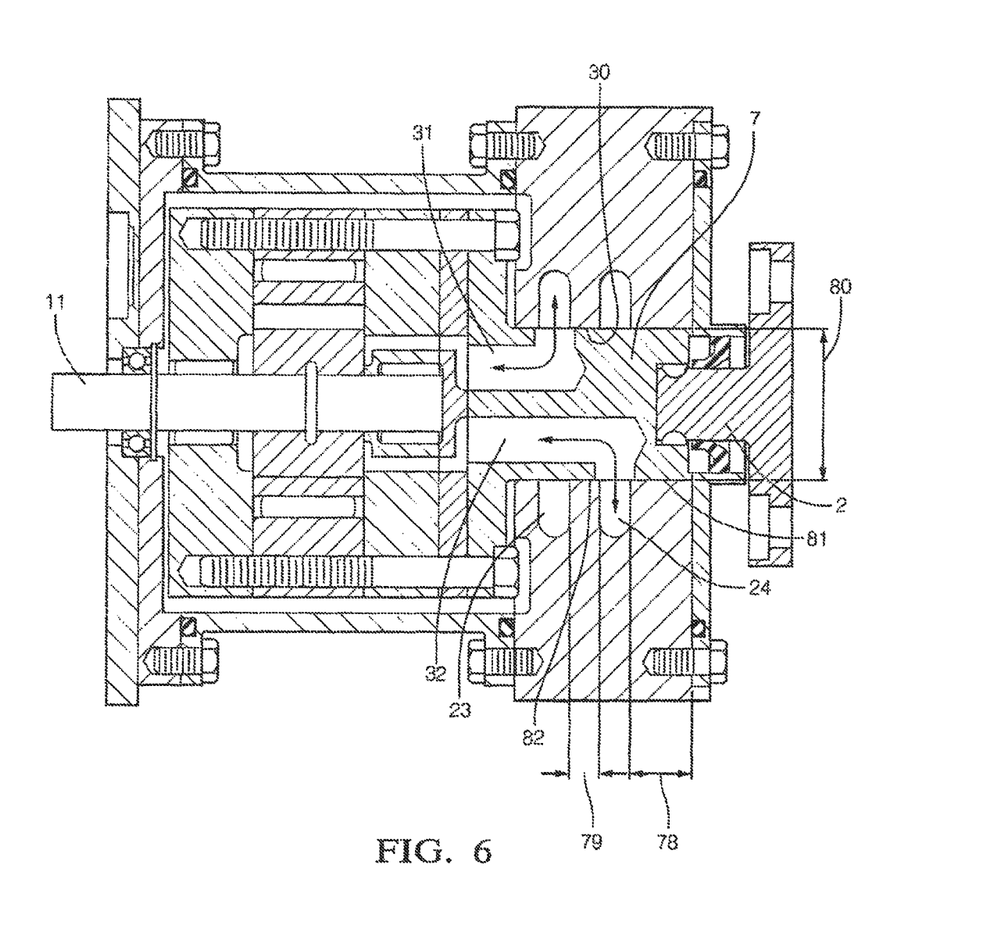
FIG. 6, is a detailed cross section of the fluid coupler of the power conversion device.

FIG. 6 illustrates a slightly enlarged view of a section of FIG. 2. Illustrated is the valve cylinder 7 which rotates inside the cylinder block 8. Passageways 31 and 32 in the valve cylinder 7 are in communication with passages and valves in the cylinder block 8 via two fly-cut grooves 23 and 24 circumventing the bore 30 in the cylinder block 8 in which the valve cylinder 7 rotates. It should be noted and is of great design convenience that despite bidirectional flow in and out of the valve cylinder 7 that one set of passages in this configuration 32 is always high pressure and the other 31 is always return or low pressure as whether the motor is being driven by the pump or slipping back in rotation the direction of delta pressure across the motor never changes.

There is shown on FIG. 6 dimensions A 78 and B 79 as well as valve cylinder diameter 80 (VCD). Dimensions A 78 and B 79 represent the linear distance of sealing land on either side 81 and 82 of the high pressure flow groove 24 fly cut within cylinder block 8. In the design as illustrated either end of the valve cylinder bore 30 are drained to tank and represent a power loss and thus should be minimized but the leakage also serves as forced fluid feed to allow a hydrodynamic rotating interface of the cylinder block 8 to the valve cylinder 7. The following well known equation defines leakage between a cylinder and a bore in which it is centered.

$$Leakage = ((\pi D C_r^3 P)/uL)k$$

Where: D is the diameter of the bore which in this case is VCD,

Cr is the radial clearance,

P is the pressure differential, u is viscosity in centipoise,

L is the length of gap in this case A and B, and k is coefficient of convenience for unit's conversion.

It can be understood from the equation that the radial gap is the most significant variable in the function and that is subject to manufacturing variance. It is also obvious that D or VCD in this case should be minimized however again looking at FIG. 6 it should be realized that the cross section defined by VCD needs to be large enough to allow two passages of sufficient cross section to channel flow to and from the motor. If VCD is enlarged there is an increase in the power loss required to turn it within the valve block due to the shearing of the oil at the interface. The commonly known equation for calculating this loss is called the Petroff's equation and is as follows:

$$\text{Power Loss} = (\pi^3/C_r) D^3 N^2 uLk$$

Where: N is the relative speed at the rotating interface, and

All other variables are the same as in the above leakage equation.

Here the conflict between wanting a small $C_r$ to reduce leakage loss and a large $C_r$ to reduce shear losses are shown to be directly at odds with each other. Also L wants be large to reduce leakage but also small to reduce shear losses. It has been found that for a system with 10-25 gpm (gallons per minute) in flow and 10-30 hp (horse power) capacity a reasonably workable combination can be achieved with D=32 mm, Cr=0.030 mm and L=10 mm.

Figure 7:
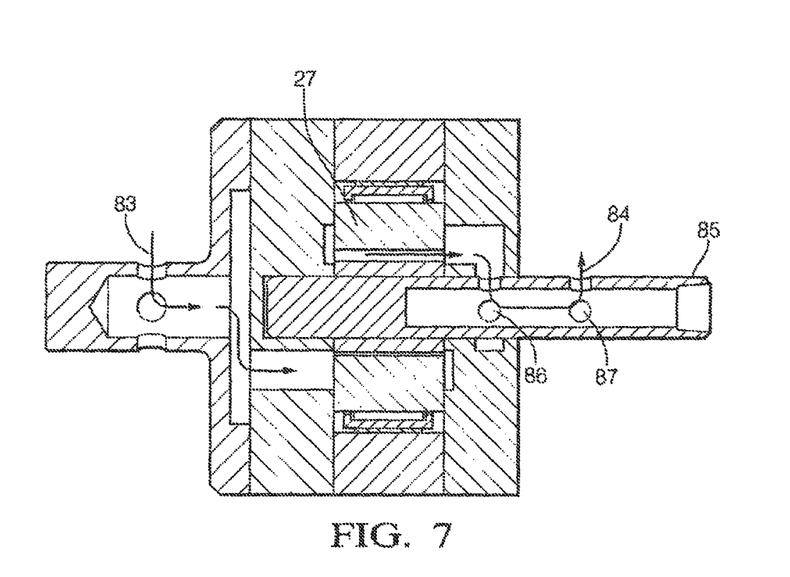
FIG. 7, is an alternate arrangement of the rotary fluid couplings of the present invention.

Referring to FIG. 7, an alternate embodiment in which D or VCD can be drastically reduced by making the two passageways in 83 and out 84 of the motor gerotor 27 come from either end rather than both from one side. This requires that on the motor shaft output end 85 the flow needs to make two transitions 86 and 87 from the central shaft hole to an interfacing shaft bores as shown. Despite the increased leakage this double rotary coupling incurs the much smaller D more than compensates. With this configuration D can easily be reduced to the range of 19 mm while still leaving more than adequate internal cross section to allow large flow volumes.

Figure 8:
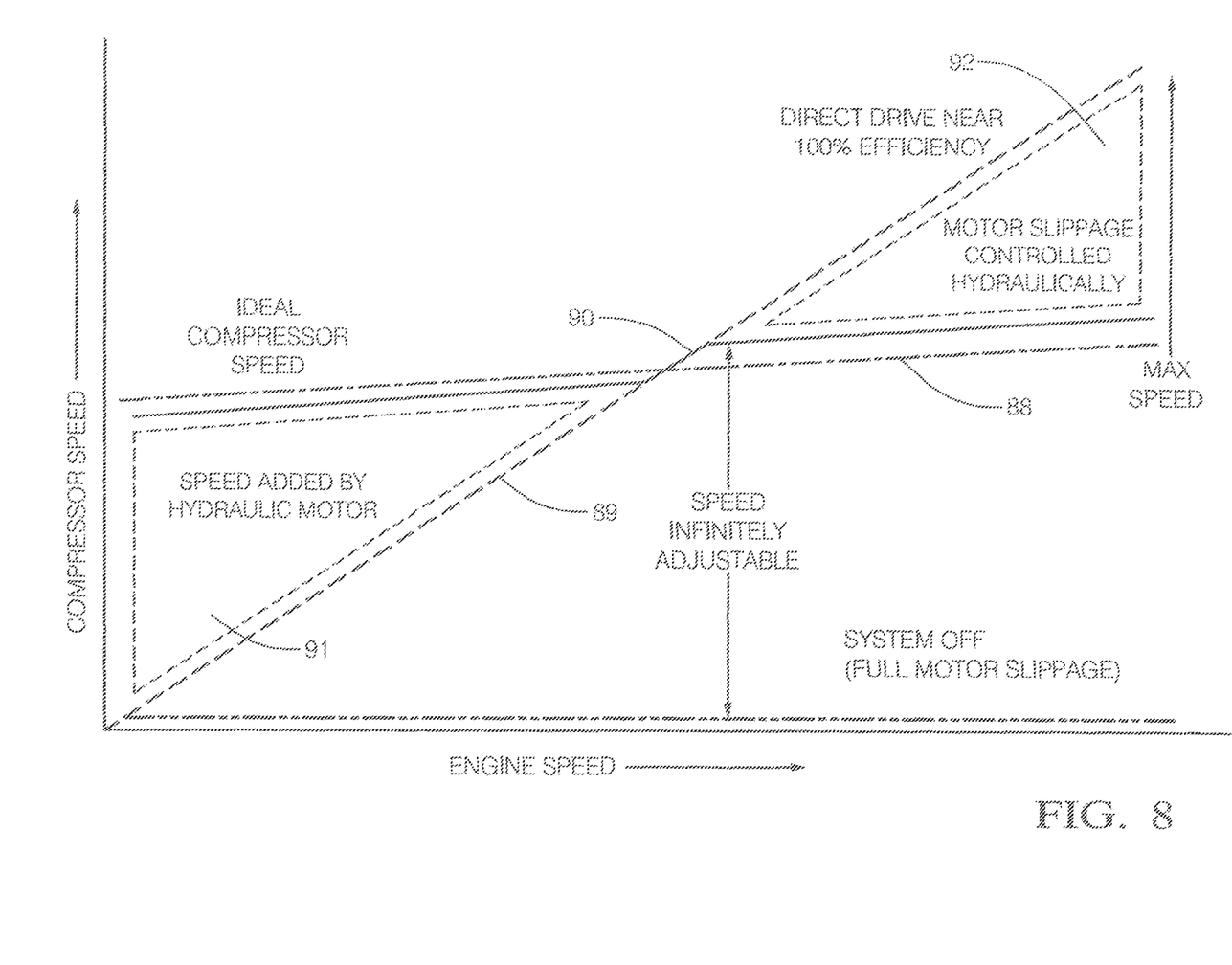
FIG. 8, is a graphical illustration of comparison of function of the device versus direct drives.

Referring to FIG. 8, the functionality of the subject invention is illustrated in comparison to a direct belt driven centrifugal compressor. The line 88 represents the desired maximum speed capability of the ideal compressor system as ideal boost capability would remain the same independent of the engine as it closely correlates to the engine torque. It remains essentially constant across engine speed with exception that there is a slight rise as engine speed increases to represent the additional internal restriction losses as the air mass flow increases. If a centrifugal compressor is driven directly by the belt its speed will be directly proportional to engine speed as shown by line 89 thus will be far from the ideal speed. Despite this deficiency the power transfer efficiency to the compressor from the engine is high as the belt and pulleys constitute minimal loss. The middle region 90 around the intersection of lines 88 and 89 represents a region of high power transmission efficiency because the power borne by the hydraulics is minimal. The two triangles of "Speed Added by Hydraulic Motor" 91 and "Motor Slippage Controlled Hydraulically" 92 represent power transfers subject to hydraulic losses in the pump and motor.

Now looking at this chart in a different light it can be recognized that the subject device is essentially a continuously variable transmission. Assuming engine speed or power input traverses from say 700 rpm to 7000 rpm the ability to maintain a near constant output to the compressor means the subject device is ranging through an input/output ratio of approximately 10×. In the midrange of engine speed the ratio can be equated to approximately 5× with minimal losses as it is essentially a direct drive mechanism. At the highest of engine speed the ratio has been reduced to 1×. At near off idle the speed ratio is 10×.

The device as discussed to this point is configured to simply let the motor slip backwards becoming a pump when the direct drive speed is higher than the desired speed. The power transfer as shown in the upper triangle is simply dissipated across the delta pressure of the metering motor slip valve. The flow could be channeled back through the pump which would then become a motor allowing torque generated in the direction of lowering the power input to the direct drive.

Figure 9:
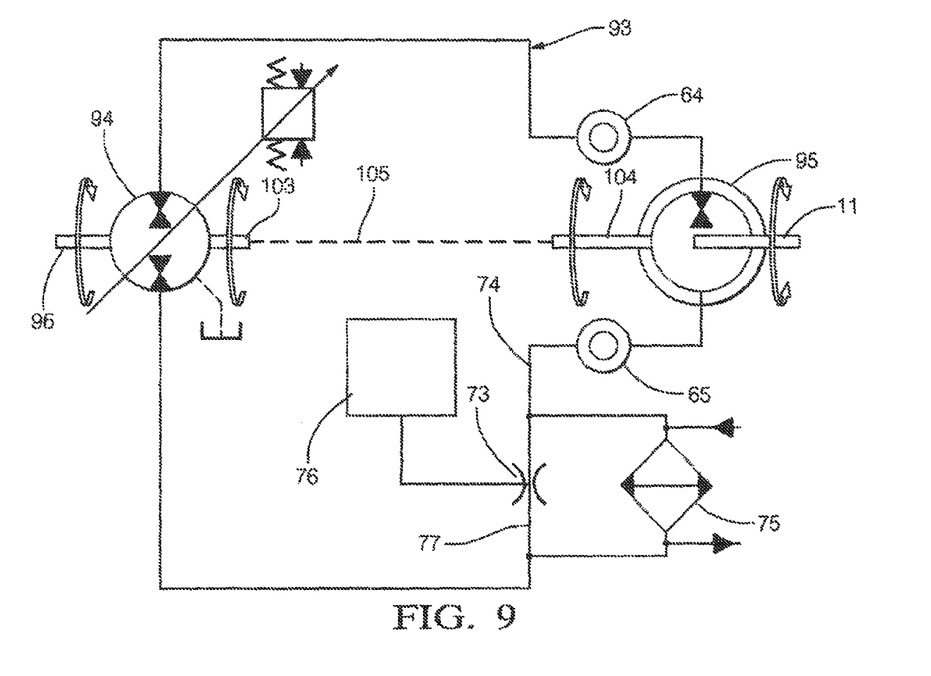
FIG. 9, is a schematic illustration of a continuously variable transmission (CVT) embodiment of the device.

FIG. 9 shows a simplified circuit 93 in which a variable displacement over center pump 94 is substituted for the fixed displacement pump 4 used in the previous embodiments. In this manner the device becomes a high efficiency continuously variable transmission (CVT). The pump control valve and the motor slip valve are removed. The motor/pump 95 "Device A" however is still mounted with its reference frame being the rotating assembly driven directly by the engine. The over center pump 94 has an output shaft 103 which is mechanically coupled with an input shaft 104 of motor/pump 95 as indicated by dotted line 105. Rotary fluid couplings 64 and 65 are still employed to carry flow in and out of this rotating motor/pump assembly 95. In operation, the variable displacement pump 94 "Device B" would still provide flow when the output of the CVT is desired to be above the output speed of the rotary input driven directly by the motor. During this mode of operation power provided directly by the engine and hydraulically delivered power are summed to provide an output. Displacement of device B 94 would be varied to allow adjustment of drive ratio. Efficiency would remain high as a large percentage of the power would be transferred at near 100% efficiency. During middrive ratio range the pump (Device B) would go to neutral position thus stopping all flow and the motor (Device A) 95 on the rotating assembly would lock and turn as the same speed as the rotation driven directly by the engine. During this mode of operation the power transfer efficiency would be very high as the assembly would be rendered essentially a locked shaft. When speed driven by the engine is higher than desired output the motor (Device A) on the rotating group would be allowed to slip backwards creating a pumping action. The variable displacement pump (Device B) would now go over center becoming a variable displacement motor. The displacement would be adjusted such that the flow being produced by the slippage of the motor (Device A) on the rotating group would allow the pump (Device A) in it's now motoring mode to match the speed by which it was being driven by the engine shaft 96. In this manner the torque load applied by the engine to the direct drive would be reduced. It should be noted that an electric or pneumatic motor could gain a similar effect if mounted as described with its reference frame rotating except power (torque) density would be much lower than with a hydraulic device.

Equations defining such a CVT would be as follows:

$$\text{Gear Ratio} = N_{In}/N_{Out} = 1/(1+D_B/D_A), \text{ and}$$

$$\text{Hydraulic Pressure} = (24\pi T_{Out})/D_A.$$

Where: $T_{Out}$=Transmission output Torque (ft-lbs), $D_A$=Displacement of Device A (cubic inches per rev), and Hydraulic Pressure is in units of psi.

$$\text{Efficiency } (D_B \text{ in pumping mode}) = N_{In}/N_{Out}(1+ (TOutD_B)/(D_A \times E_{DA} \times E_{DB}))$$

$$\text{Efficiency } (D_B \text{ in motoring mode}) = N_{In}/N_{Out}(1+ (TOutD_B/D_A) \times E_{DA} \times E_{DB}).$$

Where $E_{DA}$ and $E_{DB}$ are efficiencies of Devices A and B.

Typically automotive transmissions start in first gear in the range of a 3:1 ratio and transition to 1:1 locked in normal drive mode. Overdrive is when the ratio goes below 1:1 to perhaps 0.7:1 indicating the output of the transmission device is rotating faster than the input.

Figure 10:
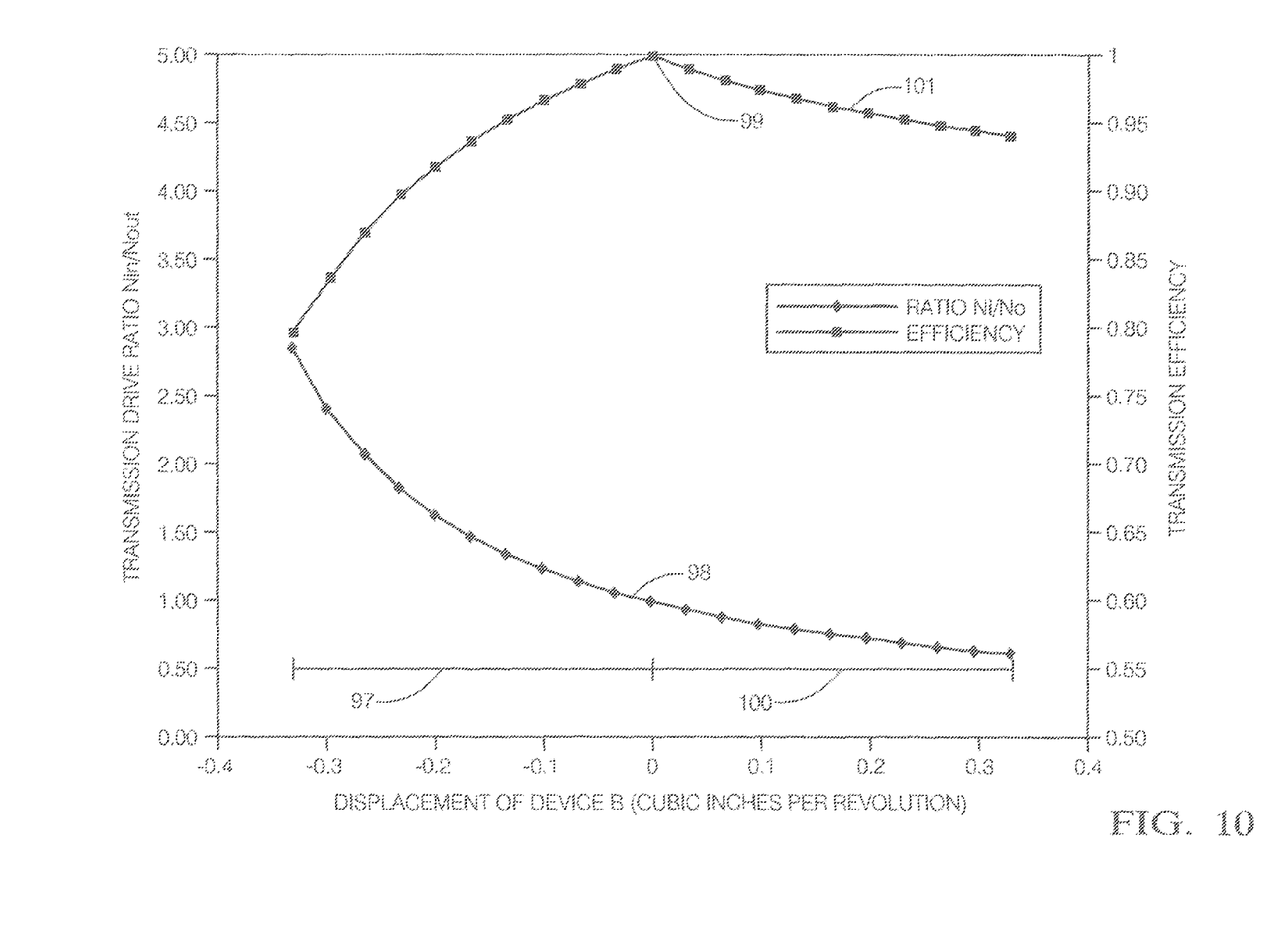
FIG. 10, is a graphical analysis showing gear ratios and efficiency as a transmission.

The graph in FIG. 10 illustrates a CVT function for an automobile application that can be accomplished with such a described device. It is similar to what is accomplished with discrete planetary gearing in transmissions used by automobiles today. Upon acceleration the CVT would start with the displacement of Device B less than zero shown at segment 97 indicating that it is in motoring mode allowing Device A to slip backward. As the vehicle accelerates the displacement of Device B would be reduced approaching zero at point 98 where it would remain for the normal drive function. It should be noted that this would provide a locked 1:1 ratio or straight through as is called yielding high efficiency point 99 at normal driving conditions. Under certain conditions the displacement of Device B could be shifted to positive segment 100 to drive the Device A faster than the direct drive engine input yielding what is defined as overdrive. In this mode the efficiency segment 101 would be quite high still as only a fraction of the power transmission would be subject to losses in Devices A and B. Thus is provided an efficient CVT function which is in some ways similar to hydrostatic transmissions but yielding much higher efficiency particularly in locked drive mode as power can be transmitted directly without being borne by the hydraulic fluid motion.

FIG. 10 shows use of a Device A of displacement 0.5 cubic inches per rev and Device B have a maximum displacement of 0.325 cubic inches per rev but these displacements could be scaled up and down for varying CVT torque capacities and hydraulic fluid pressure levels in the preferred ratio of Device B being approximately 50-80% that of Device A.

Figure 11:
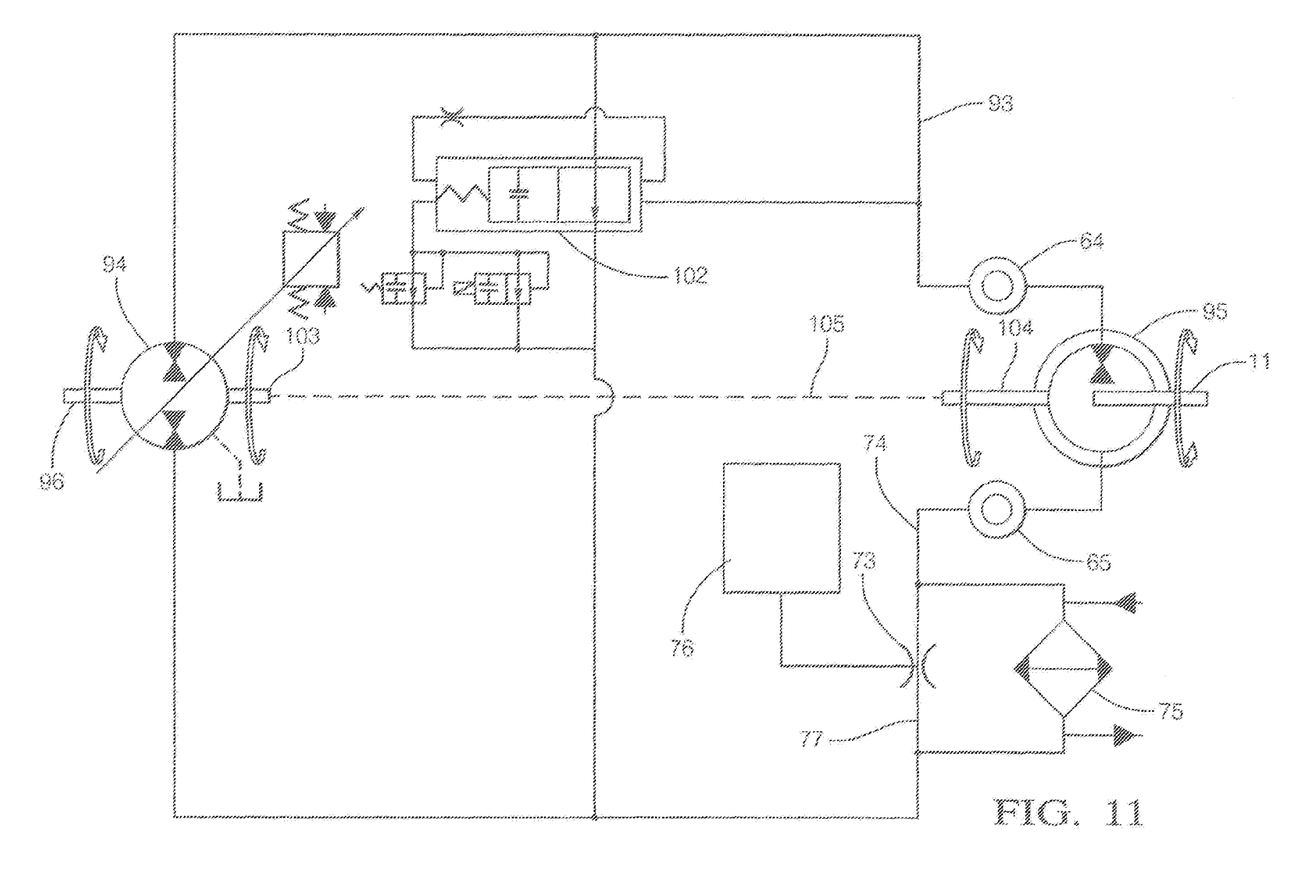
FIG. 11, is a schematic illustration of an embodiment of the CVT configuration employing a clutch feature.

It should also be noted that if an additional valve 102 is added as per FIG. 11 allowing the motor on the rotating group (Device A) to slip it can provide a clutching function which is easily accomplished with electronic control as per the motor slip valve described in FIG. 5. This clutching function could be very smooth, easily electronically controlled and virtually free of wear of any kind.

The present invention is intended for application in varied automotive vehicle applications and will be described in that context. It is to be understood, however, that the present invention could also be successfully applied in many other applications. Accordingly, the claims herein should not be deemed limited to the specifics of the preferred embodiments of the invention describer hereunder.

The following documents are deemed to provide a fuller disclosure of the inventions described herein and the manner of making and using same. Accordingly, each of the below-listed documents is hereby incorporated in the specification hereof by reference in their entirety.

U.S. Pat. No. 5,535,845 to J. Buschur entitled "Automotive Hydraulic System and Method".

U.S. Pat. No. 5,561,978 to J. Buschur entitled "Hydraulic Motor System".

U.S. Pat. No. 5,669,461 to J. Buschur entitled "Automotive Hydraulic System and Method".

U.S. Pat. No. 5,687,568 to J. Buschur entitled "Hydraulic Motor System".

U.S. Pat. No. 5,778,693 to M. Mientus entitled "Automotive Hydraulic Engine Cooling System with Thermostatic Control by Hydraulic Actuation".

U.S. Pat. No. 5,881,630 to J. Buschur et al. entitled "Apparatus and Method of Controlling Fluid Flow between a Plurality of Vehicle Components".

U.S. Pat. No. 5,946,911 to J. Buschur et al. entitled "Fluid Control System for Powering Vehicle Accessories".

U.S. Pat. No. 5,960,628 to K. Machesney et al. entitled "Hydraulically Powered Fan and Power Steering in Vehicle".

U.S. Pat. No. 5,960,748 to J. G. Lewis entitled "Vehicle Hydraulic Component Support and Cooling System".

U.S. Pat. No. 6,016,657 to J. Buschur entitled "Automotive Hydraulic System and Method".

U.S. Pat. No. 6,021,641 to J. Buschur et al. entitled "Hydraulically Powered Fan System for Vehicles".

U.S. Pat. No. 6,158,216 to J. Buschur et al. entitled "Hydraulically Powered Fan System for Vehicles".

U.S. Pat. No. 6,308,665 B1 to J. G. Lewis entitled "Vehicle Hydraulic Component Support and Cooling System".

U.S. Pat. No. 6,612,822 B2 to J. Buschur et al. entitled "Hydraulic Motor System".

U.S. Pat. No. 6,629,411 B2 to J. Buschur et al. entitled "Dual Displacement Motor Control".

U.S. Pat. No. 7,608,011 B2 to Grabowski et al. entitled "Hydrogen Fueled Hybrid Powertrain and Vehicle".

U.S. Pat. No. 7,490,594 B2 to Van Dyne et al. entitled "Super-Turbocharger".

U.S. Pat. No. 7,481,056 B2 to Blaylock et al. entitled "Turbocharger with Adjustable Throat".

U.S. Pat. No. 7,111,704 B2 to Johnson entitled "Hydrostatic Drive Apparatus for a Road Vehicle".

U.S. Pat. No. 6,502,398 B2 to Kapich entitled "Exhaust Power Recovery System".

U.S. Pat. No. 6,412,278 B1 to Matthews entitled "Hydraulically Powered Exhaust Gas Recirculation System".

U.S. Pat. No. 5,724,949 to C. Liang entitled "Hydraulic Drive for a Pressure Wave Supercharger Utilized with an Internal Combustion Engine".

U.S. Pat. No. 5,346,364 to D. Kapich entitled "Very High Speed Hydraulic Turbine Drive". And U.S. Pat. No. 4,729,225 to J. Bucher entitled "Turbo-Charged Internal Combustion Engine with Exhaust Gas Energy Recuperation".

U.S. Pat. No. 9,080,503 B2 to J. Buschur et al. entitled "Hydraulic Turbo Actuator Apparatus".

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A power conversion device comprising:
   first rotating drive shaft operable for receiving rotational motion from an external drive;
   a hydraulic motor including a rotating motor assembly mounted on and rotating with said first rotating drive shaft;

a second rotating shaft comprising an output shaft of said hydraulic motor disposed concentrically with said first rotating drive shaft and said rotating motor assembly;
at least two rotary fluid couplings forming hydraulic supply and return channels of said hydraulic motor through a rotating interface with said first drive shaft; and
a hydraulic valve in fluid communication with at least one of said rotary fluid couplings,
wherein said hydraulic valve comprises a controllable hydraulic restrictor disposed between the two rotary fluid couplings of said hydraulic motor.

2. The power conversion device of claim 1, further comprising: a relief valve in fluid communication with at least one rotary fluid coupling and controllably operable to limit pressure across said rotating fluid couplings.

3. A power conversion device comprising:
a first rotating drive shaft operable for receiving rotational motion from an external drive;
a hydraulic motor including a rotating motor assembly mounted on and rotating with said first rotating drive shaft;
a second rotating shaft comprising an output shaft of said hydraulic motor disposed concentrically with said first rotating drive shaft and said rotating motor assembly;
at least two rotary fluid couplings forming hydraulic supply and return channels of said hydraulic motor through a rotating interface with said first drive shaft;
a hydraulic pump mechanically coupled with said first shaft and in fluid communication with said hydraulic motor through said rotary fluid couplings;
a fluid reservoir; and
a hydraulic valve selectively directing pump output flow either to said hydraulic motor or said fluid reservoir.

4. A power conversion device comprising:
a first rotating drive shaft operable for receiving rotational motion from an external drive;
a hydraulic motor including a rotating motor assembly mounted on and rotating with said first rotating drive shaft;
a second rotating shaft comprising an output shaft of said hydraulic motor disposed concentrically with said first rotating drive shaft and said rotating motor assembly;
at least two rotary fluid couplings forming hydraulic supply and return channels of said hydraulic motor through a rotating interface with said first drive shaft;
a step up gearing mechanism coupled to the output shaft of said hydraulic motor; and
a centrifugal compressor coupled to said step up gearing mechanism.

5. The power conversion device of claim 4, wherein said centrifugal compressor comprises a portion of an engine forced air induction system.

6. A power conversion device comprising:
a first rotating drive shaft operable for receiving rotational motion from an external drive;
a hydraulic motor including a rotating motor assembly mounted on and rotating with said first rotating drive shaft;
a second rotating shaft comprising an output shaft of said hydraulic motor disposed concentrically with said first rotating drive shaft and said rotating motor assembly; and
a first rotary fluid coupling forming hydraulic fluid supply channels for said hydraulic motor through a first rotating interface within said first drive shaft, and a second rotary fluid coupling forming hydraulic return channels for said hydraulic motor through a second rotating interface within said second rotating shaft.

7. A power conversion device comprising:
a first rotating drive shaft operable for receiving rotational motion from an external drive;
a hydraulic motor including a rotating motor assembly mounted on and rotating with said first rotating drive shaft;
a second rotating shaft comprising an output shaft of said hydraulic motor disposed concentrically with said first rotating drive shaft and said rotating motor assembly;
at least two rotary fluid couplings forming hydraulic supply and return channels of said hydraulic motor through a rotating interface with said first drive shaft;
a hydraulic pump mechanically coupled with said first shaft and in fluid communication with said hydraulic motor through said rotary fluid couplings; and
a plurality of hydraulic control valves in fluid communication with said hydraulic motor forming a control system operable to vary hydraulic flow within said hydraulic motor to:
i.) turn the second rotating shaft faster than the drive shaft via fluid supplied by said pump being directed into the hydraulic motor to add rotary motion relative to the input shaft;
ii.) rotate the second rotating output shaft at relatively the same speed as said drive shaft by the hydraulic motor remaining near rotation less via restricting the flow between the two rotary couplings; and
iii.) turn the second rotating output shaft in an opposite direction than the input drive shaft by a controlled restriction of flow between said rotary fluid couplings.

* * * * *

UNITED STATES PATENT AND TRADEMARK OFFICE
CERTIFICATE OF CORRECTION

PATENT NO. : 9,915,192 B2
APPLICATION NO. : 14/817270
DATED : March 13, 2018
INVENTOR(S) : Jeffrey J. Buschur Page 1 of 1

It is certified that error appears in the above-identified patent and that said Letters Patent is hereby corrected as shown below:

In the Specification

Column 2, Lines 18 - 19:

Delete: " ~~220(ft-lbs)x24π/(2×61([in]^3/liter)/2(for 4 cycle))=272 psi~~ ,"

Replace with: $$\frac{220(ft-lbs) \times 24\pi}{2 \times 61(\frac{in^3}{liter})/2(for\ 4\ cycle)} = 272\ psi$$

Signed and Sealed this
Fifteenth Day of May, 2018

Andrei Iancu
*Director of the United States Patent and Trademark Office*